3,114,201
MACHINING WORK HOLDING METHOD
Anthony A. Boccaccio, Plainview, and Lawrence J. Kolodzeski, Huntington Station, N.Y., assignors to Grumman Aircraft Engineering Corporation, Bethpage, N.Y., a corporation of New York
No Drawing. Filed July 10, 1962, Ser. No. 208,946
10 Claims. (Cl. 29—424)

This invention relates in general to the manufacture of parts from metal sheets and, more particularly, to a method for holding a multiplicity of metal sheets of the same or varying thickness in rigid relationship so that machining operations can be performed thereon.

In the manufacture of parts from flat metal sheets, there is a frequent need for many parts of the same size and shape. It is well known in the art, especially during drilling and routing operations, to make up a stack of metal sheets and, after clamping the stack to prevent movement of the individual sheets, to machine the stack. Thus, when the sheets are separated after the stack is machined, the associated parts produced from each sheet of the stack will be identical.

However, in the prior art clamping methods, shifting of the sheets of the stack during machining has proved troublesome, especially at critical machining speeds. This undesirable shifting of the sheets results in a high rate of scrap and tool breakage. In addition, these prior art methods require the drilling of reference holes or require that the part be designed with special tabs for clamping purposes. These special tabs add to the cost of the part in that they represent wasted material and require a subsequent machining operation for the removal of the tab.

A further disadvantage with the prior art clamping methods is the lifting or separation due to tool pressure and chip action of the unsupported central portion of the sheets when that area is worked. This condition debases the precision of the operation and leads to an excessive burring of the machined edges of the part. As a result, the additional manufacturing steps to "clean up" the part adds to the cost.

In an effort to overcome these drawbacks, it has been proposed in the prior art to form a rigid block of the stack of sheets to be machined by using an adhesive material between the sheets of the stack. Although this has eliminated some of the drawbacks associated with the mechanical clamping means conventionally used, the bonding agents employed have introduced other problems that detract from the efficacy of the method. In general, these problems have centered in the difficulties experienced in separating the sheets after the stack has been machined and in removing the bonding material from the surfaces of the machined parts. Particularly in the case of lighter gage sheets, the problems involved in the separation and cleaning of the parts has negated the expected time and cost savings of the method.

The experimenters in the prior art in this field have, as seems logical, employed bonding agents commonly used to bond metal parts together. While these bonding agents are compounded with the intended object of securing metal parts together with a permanent bond, the use of these conventional metal bonding agents for a temporary bond seems to be dictated by the requirement that the sheets being machined must be held rigidly together. This use of a permanent bonding agent where only a transitory bond is required has proved the causitive factor of the problems encountered in the prior art methods.

Although it would seem that a suitable adhesive for a metal to metal bond would necessarily be found only in adhesives compounded for the express purpose of joining one metal to another, we have discovered that a bonding agent fulfilling the exacting requirements of our manufacturing method can be obtained by suitably plasticizing a common gelatin or animal glue. Adhesives containing gelatin or animal glue are ordinarily believed suitable only for joining paper, wood, or similar porous substances and are not normally considered for use with metals; however, our experiments have shown that such an adhesive is eminently suitable for creating a transitory bond of the required strength between two metals.

It is, therefore, the principal object of our invention to provide an improved method for manufacturing parts from metal sheets which comprises the bonding of a piled stack of metal sheets with a plasticized gelatin or animal glue to form a rigid block, performing machining operations on the block, and then subjecting the machined block to hot water or steam to dissolve the bonding agent and release the products of the machining.

It is a further object of this invention to provide a method for machining a multiplicity of metal sheets in which the sheets are superimposed on one another in a stacked arrangement such that work done on the uppermost sheet is duplicated in depth throughout the underlying sheets of the stack, and to provide means which, although readily releasable, retain the sheets rigidly fixed relative to one another during machining throughout a widespread range of tool speeds and pressures.

It is yet a further object of this invention to provide a means for holding a stack of metal sheets for machining operations which eliminates the need for mechanical clamping devices and thereby appreciably reduces the high rate of scrap, tool breakage, and rework that are substantially unavoidable when mechanical clamping means are used. Elimination of those clamping means and of the special tabs frequently provided on the sheets when such means are used also reduces manufacturing costs in that the entire sheet may be utilized and production is speeded up because an unobstructed work surface is available for machining and the need for reworking the parts is drastically reduced.

It is another object of this invention to provide an improved bonding agent for bonding a stack of sheets in a rigid block for machining purposes, said agent providing the required bonding strength and yet being readily dissolved by steam or hot water to permit a clean and rapid separation of the sheets without distortion upon completion of machining.

The novel features of the invention, as well as additional objects and advantages thereof, will be understood more fully from the following detailed description.

In carrying out the method of our invention, the metal sheets are first thoroughly cleaned by means of a trichlorethylene degreaser, for example, and then dried. The sheets are ready for the application of the adhesive, the preparation of which will next be described.

We have, in our experiments, tested a number of compositions in our search for an adhesive which would meet the exacting requirements of our method. We have found that a soluble proteinaceous material such as gelatin or animal glue dissolved in hot water and plasticized with a soluble carbohydrate will meet those requirements. The resulting adhesive will be fluid at elevated temperatures so it may be worked readily, but will set to the desired firm gel at room temperature.

A wide range of soluble poteinaceous materials and soluble carbohydrate plasticizers are suitable for our method; however, we prefer to use an adhesive composed of one part gelatin or animal glue to two parts of plasticizer such as sugar and dissolved in sufficient hot water. We have found it advisable to vary the proportions of gelatin or animal glue to plasticizer to suit the conditions, such as stack height or type of material, to be encountered during machining. It is also advisable to add a suitable preservative to the composition if prolonged storage is anticipated.

An illustrative but non-limiting example of an adhesive composition for laminating a stack of aluminum sheets for a routing and drilling operation is as follows:

| | Parts |
|---|---|
| 379 gram hide glue | 1 |
| Sugar | 2 |
| Water | 6 |

The mixture is heated to 180° F. and maintained at that temperature until all the ingredients are dissolved. A thin coat of the hot adhesive is applied by any suitable means, such as by spraying, rolling, or brushing, to both sides of the cleaned metal sheets. The sheets that will be the top and bottom sheets of the stack should, of course, be coated on only one side. The coated sheets are allowed to dry until the adhesive is tacky to the touch. Then the sheets are stacked and the adhesive is allowed to set under sufficient pressure to ensure that the surfaces of the sheets are in good intimate contact.

If desired, the laminated stack of sheets can be machined without any further preparation being required. However, the adhesive is not time limited and we have found that the laminated stacks can be stored for long periods of time without showing any deterioration of the bond.

If the stack is to be worked in a routing or drilling machine, the stack is first bonded with a brush coat of the adhesive to a standard flat holding plate which is slightly larger than the stacked sheets. To avoid damaging the standard flat holding plate, we have found it preferable to use a buffer or interlayer of from 1/16 to 1/8-inch kraft board between the stack and the holding plate. This kraft board allows a full cut to be made through the stack such that every sheet in the stack is worked and yet the chance of the holding plate being cut or scored are minimized so that the holding plate may be re-used repeatedly. The kraft board is bonded between the stack and the holding plate with a brush coat of the adhesive.

The laminated stack of sheets is secured by means of the holding plate to the work holding chuck of the machine. Magnetic or vacuum work holding chucks are preferable because of their time saving factor, but it is obvious that mechanical clamps may be used to secure the holding plate in position without obstructing tool freedom with respect to the stack of sheets.

For routing operations, we have found it preferable to use high machining speeds in the order of from 20,000 to 25,000 revolutions per minute, with linear feed rates of 20 inches per minute or higher for routing patterns. As is well known in the art, the machining speeds and type of router used for maximum efficiency will be governed to a great extent by the material being worked. For routing aluminum, we have successfully used linear feed rates of up to 90 inches per minute with a number of test specimens and it seems probable that substantially higher rates should be obtainable when higher speed machines and proper cutting tools become available. Unlike machining operations performed on stacks of sheets which have been clamped in position by conventional means, in our method, feed rates and tool speeds are not a critical factor in producing clean parts. Parts which have been routed from the laminated stack of sheets of our method have clean edges and generally do not require a deburring operation after machining.

After machining operations are completed, the machined stack with the holding plate and kraft board are removed from the machine and placed in a suitable receptacle such as a wire basket. The receptacle and its contents are then immersed in a tank of hot water maintained at substantially 180 to 200° F. until the adhesive dissolves. Upon separating, the individual parts are removed from the tank, spray rinsed with hot water, and then dried. Because of convenience, we prefer to use immersion in hot water to dissolve the adhesive, but it is obvious that other suitable means such as a spray of steam may be employed for the same purpose.

In the description given above, the adhesive used to bond the metal sheets to one another is applied directly to the metal surfaces being bonded. However, it is also within the spirit and scope of this invention to apply the adhesive to a backing material which subsequently is interposed between the surfaces to be bonded together. Thus, a thin sheet of backing material, such as kraft paper, is coated on both sides with our adhesive composition and allowed to dry out to a tack-free surface. Before use, this adhesive-impregnated paper is cut to the proper size, and this adhesive is activated by being moistened with a wet brush or a spray of steam or water. The paper sheets with the activated adhesive are interposed between the metal sheets to be bonded and the adhesive is allowed to set with sufficient pressure being maintained on the stack to ensure a good bonding contact between surfaces. The subsequent processing of the bonded stack of metal sheets is identical with that described above. The paper interlayers produce no distinguishable variation in the strength of the bond between the metal sheets and the interlayers float free of the products of the machining when the stack is immersed in hot water when machining is completed.

Although shown and described in what is believed to be the most practical and preferred embodiment, it is apparent that departures therefrom will suggest themselves to those skilled in the art and may be made without departing from the spirit and scope of the invention. We therefore do not wish to restrict ourselves to the particular details described, but desire to avail ourselves of all modifications that may fall within the scope of the appended claims.

Having thus described our invention, what we claim is:

1. The method of manufacturing parts from metallic sheets comprising coating adjoining surfaces of a plurality of said sheets with an aqueous solution of a soluble proteinaceous material and a soluble carbohydrate, stacking said sheets, bonding said sheets under pressure to form a rigid block, machining said block of sheets, and removing said aqueous solution to release the products of said machining.

2. The method of manufacturing parts from metallic sheets comprising coating adjoining surfaces of a holder plate and a plurality of said sheets with an aqueous solution of a soluble proteinaceous material and a soluble carbohydrate, stacking said sheets on said plate, bonding said plate and sheets under pressure to form a rigid block, mounting said block on the work holder of a machine, machining said sheets of said block, removing said machined block from said work holder, exposing said machined block to moisture maintained at a suitable temperature to dissolve said aqueous solution such that the products of said machining and said holding plate are released from one another.

3. The method of manufacturing parts from metallic sheets comprising coating adjoining surfaces of a holding plate, buffer board, and a plurality of said sheets with an aqueous solution of a soluble proteinaceous material and a soluble carbohydrate, placing said buffer board on said holding plate, stacking said sheets on said buffer board, bonding said plate, board, and sheets under pressure to form a rigid block, mounting said block on the work holder of a machine, machining said sheets of said block, removing said machined block from said work holder, exposing said machined block to moisture maintained at a suitable temperature to dissolve said aqueous solution such that the products of said machining, said buffer board, and said holding plate are released from one another.

4. The method of manufacturing parts from metallic sheets comprising coating both sides of a plurality of paper sheets with an aqueous solution of soluble proteinaceous material and a soluble carbohydrate, stacking said metallic sheets with a sheet of said coated paper interposed between each of said metallic sheets, bonding said stack of metallic sheets and interposed coated paper sheets under pressure to form a rigid block, machining said block, and removing said coated paper sheets to release the products of said machined metallic sheets.

5. The method of manufacturing parts from metallic sheets comprising coating both sides of a plurality of paper sheets with an aqueous solution of soluble proteinaceous material and a soluble carbohydrate, stacking said metallic sheets on a holding plate with a sheet of said coated paper interposed between each of said metallic sheets of said stack and between said stack and said holding plate, bonding said stack of metallic sheets and holding plate and interposed coated paper sheets under pressure to form a rigid block, mounting said block on the work holder of a machine, machining said metallic sheets of said block, removing said machined block from said work holder, exposing said machined block to moisture maintained at a suitable temperature to dissolve said aqueous solution coating said paper sheets such that the products of said machined metallic sheets, said holding plate, and said paper sheets are released from one another.

6. The method of manufacturing parts from metallic sheets comprising coating both sides of a plurality of paper sheets with an aqueous solution of soluble proteinaceous material and a soluble carbohydrate, stacking said metallic sheets on a buffer board and a holding plate with said board located between said stack of sheets and said plate, interposing a sheet of said coated paper between each of said metallic sheets of said stack and between said stack and said buffer board and between said board and said holding plate, bonding said stack of metallic sheets, buffer board, and holding plate and interposed coated paper sheets under pressure to form a rigid block, mounting said block on the work holder of a machine, machining said metallic sheets of said block, removing said machined block from said work holder, exposing said machined block to moisture maintained at a suitable temperature to dissolve said aqueous solution coating paper sheets such that the products of said machined metallic sheets, said buffer board, said holding plate, and said paper sheets are released from one another.

7. The method defined in claim 4 in which the paper sheets are coated on both sides with an aqueous solution of soluble proteinaceous material and a soluble carbohydrate prior to use and then dried, said dried coated paper sheets being activated by the addition of a suitable amount of moisture before they are interposed between the metallic sheets just prior to the bonding step of the method.

8. The method defined in claim 1 in which the soluble proteinaceous material is a high gram strength animal glue.

9. The method defined in claim 1 in which the soluble proteinaceous material is a gelatin.

10. The method defined in claim 1 in which the soluble carbohydrate is sugar.

References Cited in the file of this patent
UNITED STATES PATENTS

| | | |
|---|---|---|
| 1,280,893 | Steenstrup | Oct. 8, 1918 |
| 1,332,445 | Mershon | Mar. 2, 1920 |
| 2,240,685 | Bond | May 6, 1941 |
| 2,855,664 | Griffith et al. | Oct. 14, 1958 |
| 3,084,426 | Novak | Apr. 9, 1963 |